(12) United States Patent
Vyssotski

(10) Patent No.: US 7,602,195 B2
(45) Date of Patent: Oct. 13, 2009

(54) SINGLE PIN MULTI-STATE IDENTIFIER USING RC TIMING ELEMENT

(75) Inventor: Nikolai Vyssotski, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 11/933,503

(22) Filed: Nov. 1, 2007

(65) Prior Publication Data

US 2009/0115428 A1    May 7, 2009

(51) Int. Cl.
G01R 27/26 (2006.01)
(52) U.S. Cl. .......................... 324/678; 324/711; 327/37; 327/344; 710/104
(58) Field of Classification Search ................. 324/678; 327/143
See application file for complete search history.

(56) References Cited

U.S. PATENT DOCUMENTS

| | | | | |
|---|---|---|---|---|
| 5,239,485 A | * | 8/1993 | Ohba | ........................ 710/104 |
| 5,630,270 A | * | 5/1997 | O'Malley | .................... 29/832 |
| 5,870,621 A | * | 2/1999 | Walsh et al. | ................... 712/32 |
| 6,119,949 A | * | 9/2000 | Lindstrom | ................ 236/20 R |
| 7,028,233 B2 | * | 4/2006 | Hadley et al. | ............... 714/707 |
| 2005/0162651 A1 | * | 7/2005 | Sim et al. | ................... 356/394 |
| 2006/0250144 A1 | * | 11/2006 | Braun et al. | ................ 324/678 |
| 2008/0042701 A1 | * | 2/2008 | Weiss et al. | ................. 327/143 |
| 2008/0157782 A1 | * | 7/2008 | Krah | .......................... 324/538 |

OTHER PUBLICATIONS

Texas Instruments NA555, NE555, SA555, SE555 Precision Timers Data Sheet, SLFS022F, Sep. 1973—Revised Jun. 2006, Copyright Texas Instruments, Inc., 1973-2006.*

* cited by examiner

*Primary Examiner*—Timothy J Dole
*Assistant Examiner*—Benjamin M Baldridge
(74) *Attorney, Agent, or Firm*—Haynes and Boone, LLP

(57) ABSTRACT

In a circuit identifier, an electrical circuit includes an output node to output an electrical signal. A resistor device and a capacitor device, electrically in series with the resistor device, receive at least a portion of the electrical signal. A counter device determines a time for the capacitor device to reach a predetermined charge and assigns a value to the time for the capacitor device to reach the predetermined charge. A processor or other system reads the value assigned by the counter device and identifies the capacitor from a predetermined list of capacitors. The identification of the capacitor identifies a revision of the circuit.

17 Claims, 3 Drawing Sheets

SINGLE PIN MULTI-STATE IDENTIFIER USING RC TIMING ELEMENT

BACKGROUND

The present disclosure relates generally to information handling systems, and more particularly to a circuit identifier operable to identify a PC board revision.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Throughout the life cycle of an IHS design there are generally multiple revisions for the printed circuit boards making up the electronics for the IHS. In order to operate properly or most efficiently, it may be desirable for the processor for the IHS to determine the revision of the circuit board to determine how to best operate. For example, revisions in electronics for the circuit board may require different processes or different devices to be operated differently during the operation of the IHS. Detecting the circuit board revision is typically performed by using multiple inputs on the processor from the circuit to determine what combination of the multiple inputs are high (e.g., energized) and thus the processor can determine what revision of the circuit board is installed in the IHS. However, inputs to the processor are costly to produce and the traditional systems use multiple inputs to the processor.

Accordingly, it would be desirable to provide an improved circuit identifier.

SUMMARY

According to one embodiment, an electrical circuit includes an output node to output an electrical signal. A resistor device and a capacitor device, electrically in series with the resistor device, receive at least a portion of the electrical signal. A counter device determines a time for the capacitor device to reach a predetermined charge and assigns a value to the time for the capacitor device to reach the predetermined charge. A processor or other system reads the value assigned by the counter device and identifies the capacitor from a predetermined list of capacitors. The identification of the capacitor identifies a revision of the circuit.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
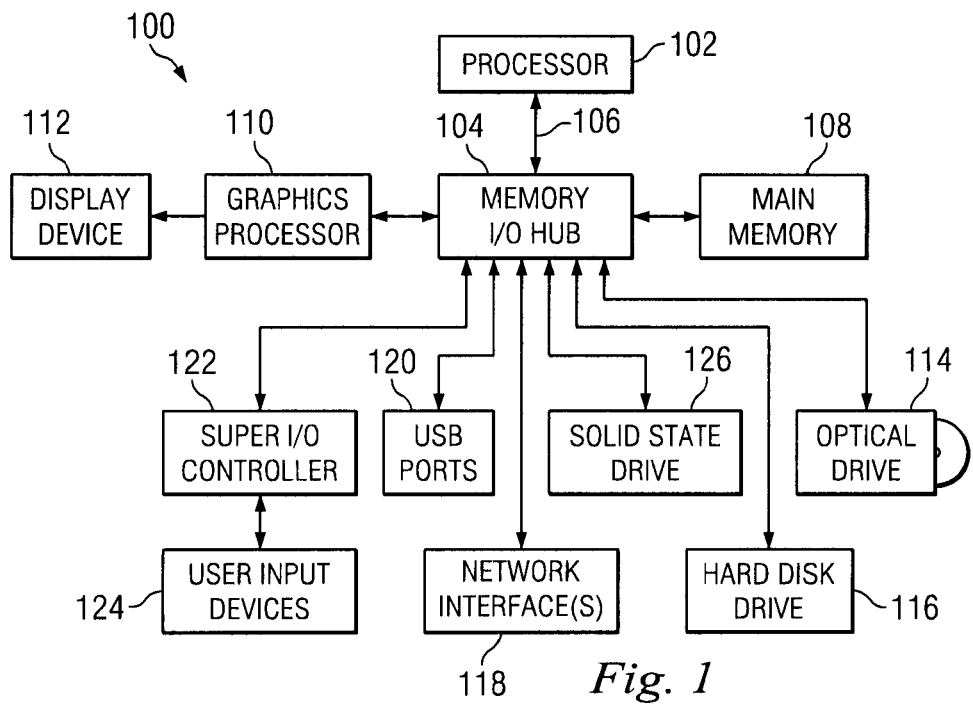
FIG. 1 illustrates an embodiment of an information handling system (IHS).

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Figure 2:
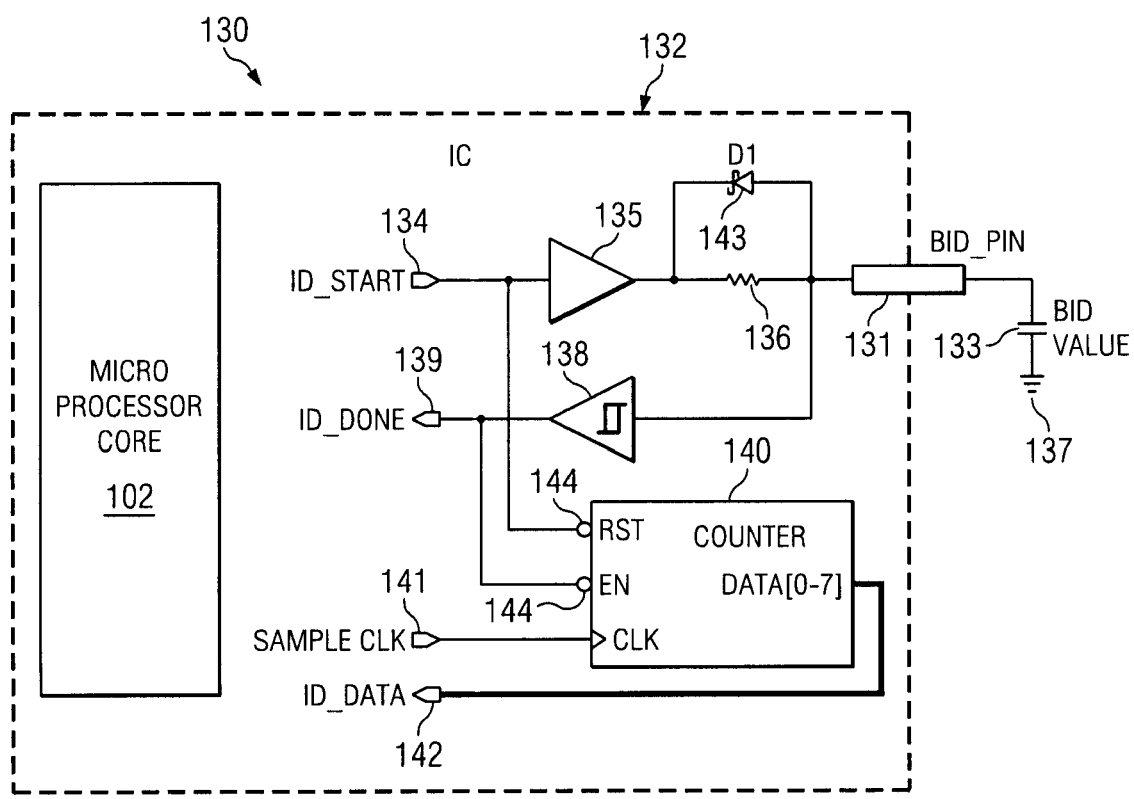
FIG. 2 illustrates an embodiment of a circuit to identify a circuit board.

FIG. 2 illustrates an embodiment of a circuit 130 to identify a circuit board. In this embodiment, the circuit 130 uses only one external board identification (BID) pin, pin 131, on the integrated circuit (IC) package 132 to identify the circuit 130 by measuring the time required to charge a capacitor 133 that is external to the IC package 132. Using the external capacitor 133 allows for using a different value of capacitor 133 with each circuit 130 revision. Having different charge times of the capacitor 133 for each revision of the circuit 130, the processor 102 can identify the circuit 130, such as, the circuit revision.

In an embodiment, the circuit 130 is a digital circuit to measure the value of the capacitor 133. When circuit 130 identification is required, the ID_Start node 134 is driven high by the processor 102. The power flows from ID_Start node 134 through amplifier 135, resistor 136, capacitor 133, and then to ground 137, thereby creating an RC circuit and charging the capacitor 133 with the voltage of the capacitor 133 substantially following the equation $V(t)=Vcc*(1-exp(-t/RC))$ where $V(t)$ is the voltage over time, Vcc is the voltage of node ID_Start 134, t is the time for charging the capacitor 133, R is the value of resistor 136, and C is the value of the capacitor 133. Any type of capacitor can be used for capacitor 133. In an embodiment, the circuit devices within the IC package 132 (e.g. value of resistor 136) will be fixed over various revisions, therefore, the value of the capacitor 133 can be varied using different values of an external capacitor 133 to change the length of time for charging the capacitor 133. Then, using software code within the processor 102, the processor 102 may determine the revision of the circuit 130 by determining the length of time for charging the capacitor 133.

While ID_Start 134 is driven high and the capacitor 133 voltage is below the a predetermined threshold voltage value (Vth) to trigger a Schmitt trigger 138, the ID_Done node 139 remains low and the counter 140 is enabled to count using a clock input from the Sample Clk node 141. By having active low inverters 144 at the Reset (RST) and Enable (EN) inputs of the counter 140, allows the counter 140 to reset when the ID_Start node 134 is driven low and to count when the ID-Done node 139 is driven low. When the capacitor 133 reaches Vth, the Schmitt trigger 138 will trip, thereby driving high the ID_Done node 139, which in turn, stops the counter 140 from counting. The counter 140 may assign a data value to the length of time for the capacitor 133 to charge to Vth. For example, at the commencement of charging the capacitor 133, the data value may be 0. Then, at a time of fully charging the capacitor 133, where the capacitor is valued at the longest charge time in the circuit 130, to reach the Vth, the data value may be 7. The length of time between zero charge and Vth charge for the capacitor 133 may be valued proportionately between 0 and 7. When the ID_Done node 139 is driven high, the processor 102 can read from the ID_Data node 142 on the counter 140 the value assigned by the counter 140. The value assigned by the counter 140 (e.g., 0-7) informs the processor what revision the circuit 130 is by determining the value of the capacitor 133 and determining where the value of the capacitor 133 falls within a list of capacitors having a range of values. After the value of the capacitor 133 is determined, the processor 102 may operate accordingly.

If another identification cycle is needed, the processor 102 can drive the ID_Start node 134 low for a short period of time. Driving the ID_Start node 134 low allows the output of amplifier 135 to quickly discharge the capacitor 133 via the Schottky diode 143. Then, after the capacitor 133 is discharged, the cycle can be repeated starting again when the ID_Start node 134 is driven high.

Figure 3:
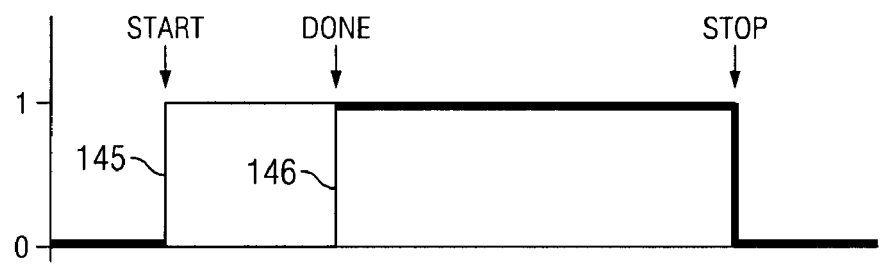
FIG. 3 illustrates a graph of signals at nodes in the circuit of FIG. 2.

FIG. 3 shows a graph of signals at nodes in the circuit of FIG. 2. Signal 145 shows the signal at the ID_Start node 134. Signal 146 shows the signal at the ID_Done node 139. Both the ID_Start node 134 and the ID_Done node 139 begin with a low or zero signal when the circuit 130 begins operating. When circuit identification begins at start, the signal 145 goes from a value of zero to a value of one (e.g., Vcc) when the ID_Start node 134 is driven high. The signal 145 stays high or one until another identification cycle is needed and the ID_Start node 134 is driven low. At this point, the signal 145 returns to a value of zero. The signal 146 remains at zero until the capacitor 133 reaches the Vth and the Schmitt trigger 138 trips at Done, thereby driving the ID_Done node 139 high and the signal 146 goes from a value of zero to a value of one (e.g., Vcc). The signal 146 remains at a value of one until the capacitor 133 discharges at Stop and the ID_Done node 139 is again driven low and the signal 146 returns to a value of zero.

Figure 4:
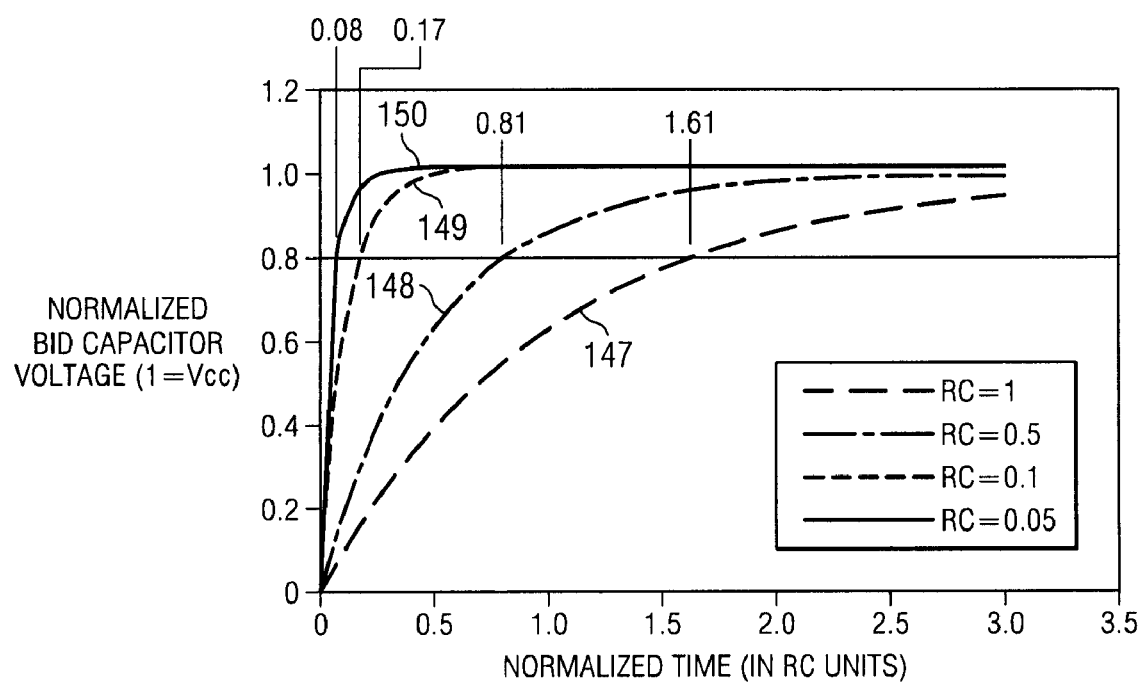
FIG. 4 illustrates a graph of normalized time (in RC units) v. normalized capacitor voltage for the circuit of FIG. 2.

FIG. 4 shows a graph of normalized time (in RC units) v. normalized capacitor voltage (1=Vcc) for the circuit of FIG. 2. In an embodiment, resistor 136 and external capacitor 133 values comprise a timing constant of the circuit (RC). As shown in the example of FIG. 4, the graph depicts different times needed to charge four different capacitors (e.g., each one having a different value) that may be used to identify four unique circuit/circuit board revisions. In the embodiment of this graph, it is presumed that Vth=0.8 Vcc for Schmitt trigger 138. The timing scale is normalized in respect to RC. Thus, if R=100K, C=1 uF, RC=100 mS, and Time 2RC=200 mS). Using different capacitors 133, will yield different curves. Curve 147 shows an RC value of 1, curve 148 shows an RC value of 0.5, curve 149 shows an RC value of 0.1, and curve 150 shows an RC value of 0.05.

It is understood that care should be taken in selecting capacitor 133 values to allow for manufacturing value tolerances of Vth of Schmitt trigger 138, resistor 136, and capacitor 133 as well as the effect of temperature changes on those values. Capacitor values should be picked in a way to avoid overlap of counter values for all extreme cases of tolerance stack-up.

Figure 5:
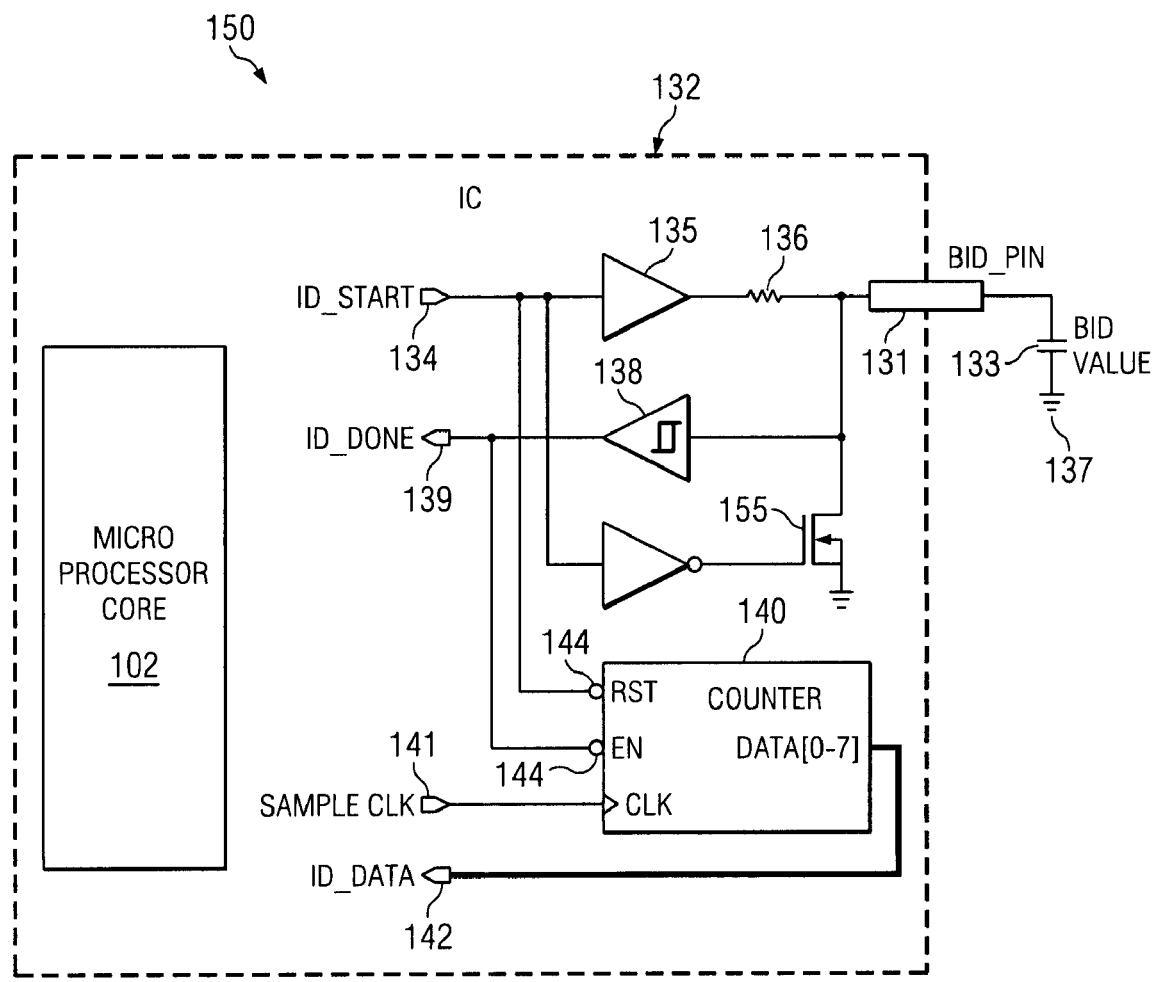
FIG. 5 an embodiment of a circuit to identify a circuit.

FIG. 5 shows an embodiment of a circuit 150 to identify a circuit. The circuit 150 operates substantially similarly to the circuit 130 except that instead of discharging the capacitor 133 through the diode 143, the capacitor 133 is discharged through a field effect transistor (FET) 155. It will be readily understood by those having ordinary skill in the art that in other embodiments, the capacitor 133 may be discharged through a bipolar junction transistor (BJT) (not shown) or any other switching device. It is also understood that in alternative embodiment, the counter 140 may be reset at RST and may be enabled at EN by having the ID_Start node 134 and/or the ID_Done node 139 driven low instead of driven high.

In summary, the disclosure, illustrated in FIGS. 1-5, describes embodiments of circuits using a single pin 133 on an IC package 132 to identify board revision by measuring the time required to charge an external capacitor 133. Thus, the external timing capacitor 133 value will be changed with each board revision to allow microprocessor 102 IC 132 to uniquely identify board revisions. The IC 132 may incorporate a basic digital circuitry need to measure capacitor 133 value. For an embodiment, the ID_Start node 134 will be driven high when board identification is required. The external capacitor 133 (unique to each board revision) will start charging with its voltage substantially following the equation $V(t)=Vcc*(1-exp(-t/RC))$. While the ID_Start node 134 is driven high and the capacitor voltage is below a threshold value (Vth) of the Schmitt trigger 138, the ID_Done node 139 remains low, thus allowing the counter 140 to count. As soon as the capacitor 133 voltage reaches Vth, the circuit 130 will trip Schmitt trigger 138 driving the ID_Done node 139 high and stopping the counter 140. When the ID_Done node 139 is found high, the IC microprocessor core 102 can read the value of the ID_Data node 142 from the counter 140 uniquely identifying the external capacitor 133 and thus board revision. If another identification cycle is needed the ID_Start node 134 can be driven low for a short duration therein allowing the output of the amplifier 135 to quickly discharge the capacitor 133 via the diode 143. Then the cycle can be repeated again starting with rising edge on the ID_Start node 134.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An electrical circuit, at least partially on a printed circuit board, for determining a design revision status of the printed circuit board, comprising:
    a node of the electrical circuit on the printed circuit board, to provide an electrical signal;
    a resistor device of the electrical circuit on the printed circuit board, to receive at least a portion of the electrical signal;
    an external capacitor device having a capacitance value that is unique to each board revision, connected electrically in series with the resistor device, with respect to the electrical signal, to receive at least a portion of the electrical signal;
    a counter device to determine a time for the capacitor device to reach a predetermined charge and to assign a value to the time for the capacitor device to reach the predetermined charge; and
    a system to read the value assigned by the counter device and identify the capacitor from a predetermined list of capacitors, and wherein the identification of the capacitor identifies the design revision status of the printed circuit board.

2. The electrical circuit of claim 1, wherein the electrical signal is a digital signal.

3. The electrical circuit of claim 1, further comprising:
    a Schmitt trigger to stop the counter device from timing after the capacitor device reaches the predetermined charge.

4. The electrical circuit of claim 1, wherein the circuit is an integrated circuit having the capacitor as an external device from the integrated circuit.

5. The electrical circuit of claim 1, further comprising:
    a switch device electrically parallel to the resistor device to discharge the capacitor device.

6. The electrical circuit of claim 5, wherein the switch device is an electronic switch device.

7. An information handling system for determining a design revision status of a printed circuit board, comprising:
    an electrical circuit at least partially on the printed circuit board, having an internal node to provide an electrical signal;
    an internal resistor device on the printed circuit board to receive at least a portion of the electrical signal;
    an external capacitor device having a capacitance value that is unique to each board revision, connected electrically in series with the resistor device, with respect to the electrical signal, to receive at least a portion of the electrical signal;
    a counter device to determine a time for the capacitor device to reach a predetermined charge and to assign a value to the time for the capacitor device to reach the predetermined charge; and
    a processor to read the value assigned by the counter device and identify the capacitor from a predetermined list of capacitors, and wherein the identification of the capacitor identifies the design revision status of the printed circuit board.

8. The information handling system of claim 7, wherein the electrical signal is a digital signal.

9. The information handling system of claim 7, further comprising:
    a Schmitt trigger to stop the counter device from timing after the capacitor device reaches the predetermined charge.

10. The information handling system of claim 7, wherein the circuit is an integrated circuit having the capacitor as an external device from the integrated circuit.

11. The information handling system of claim 7, further comprising:
    a switch device electrically parallel to the resistor device to discharge the capacitor device.

12. The information handling system of claim 11, wherein the switch device is an electronic switch device.

13. A method to identify a design revision status of a printed circuit board, comprising:
    providing an electrical circuit, at least partially on the printed circuit board, wherein the electrical circuit comprises:
        an internal node on the printed circuit board to provide an electrical signal;
        an internal resistor device on the printed circuit board to receive at least a portion of the electrical signal;
        an external capacitor device having a capacitance value that is unique to each board revision, connected electrically in series with the resistor device, with respect to the electrical signal, to receive at least a portion of the electrical signal; and
        a counter device to determine a time for the capacitor device to reach a predetermined charge and to assign a value to the time for the capacitor device to reach the predetermined charge;
    reading the value assigned by the counter device; and
    identifying the capacitor from a predetermined list of capacitors, wherein the identification of the capacitor identifies the design revision status of the printed circuit board.

14. The method of claim 13, wherein the electrical signal is a digital signal.

15. The method of claim 13, further comprising:
    stopping the counter device using a Schmitt trigger after the capacitor device reaches the predetermined charge.

16. The method of claim 13, wherein the circuit is an integrated circuit having the capacitor as an external device from the integrated circuit.

17. The method of claim 13, further comprising:
    discharging the capacitor device through switch device, wherein the switch device is electrically parallel to the resistor device.

* * * * *